Sept. 21, 1971 J. L. BOWDEN 3,606,808
QUICK-ACTING CHUCKS
Filed Nov. 25, 1969 2 Sheets-Sheet 1
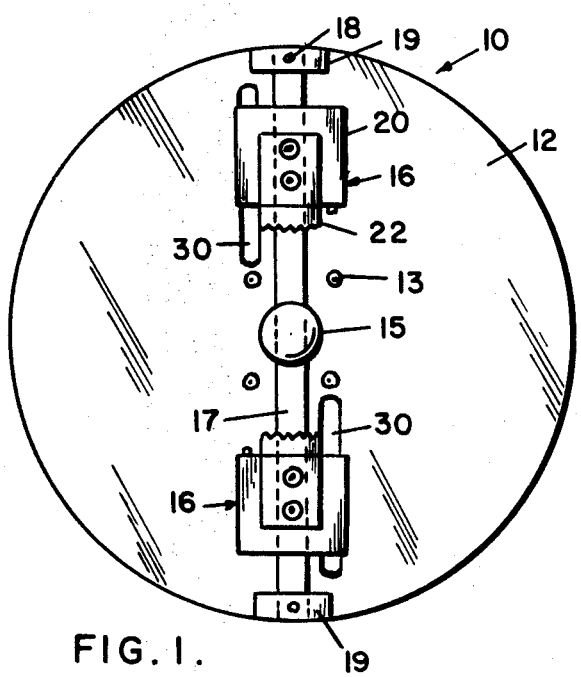
FIG.1.
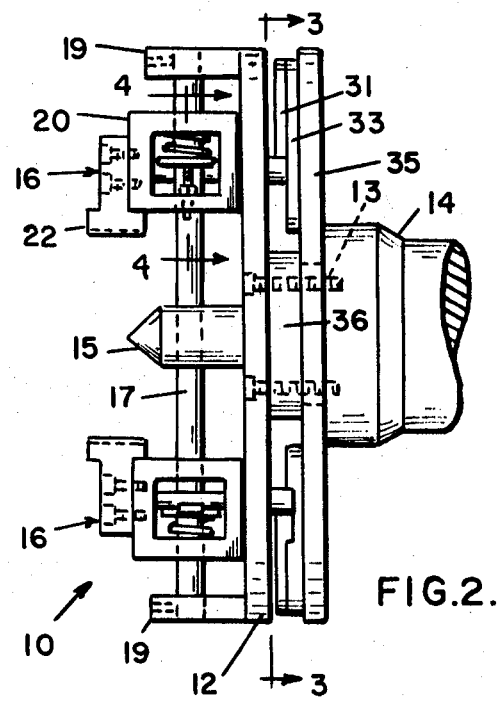
FIG.2.
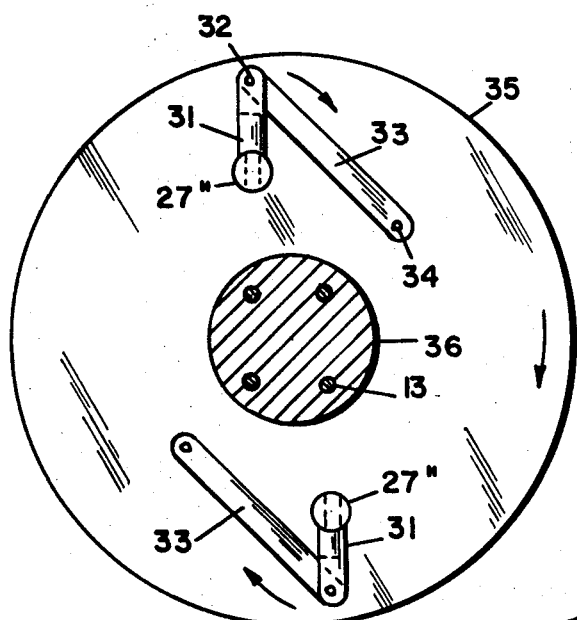
FIG.3.
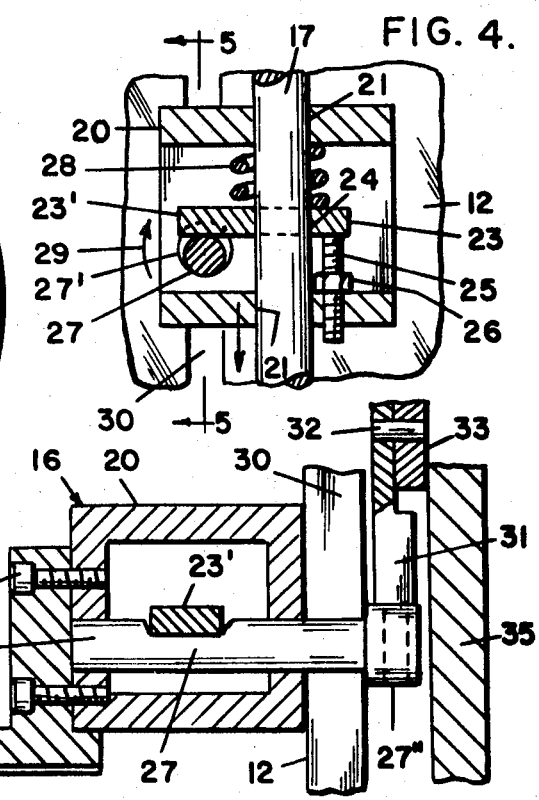
FIG.4.
FIG.5.
INVENTOR:
JERRY L. BOWDEN
By: *Jerry B. Cesak*

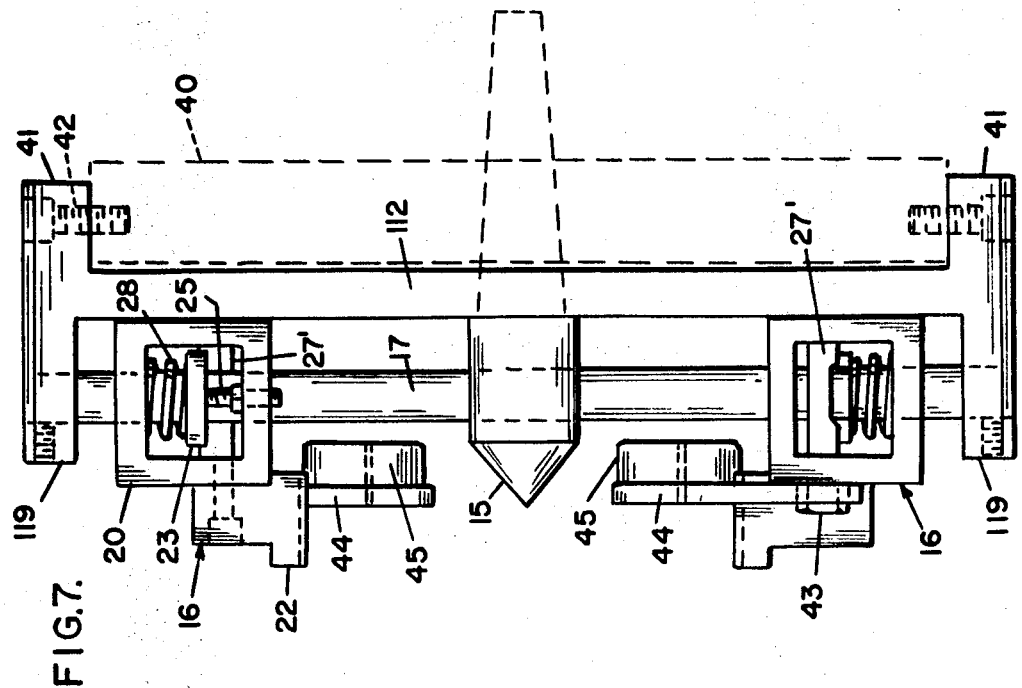
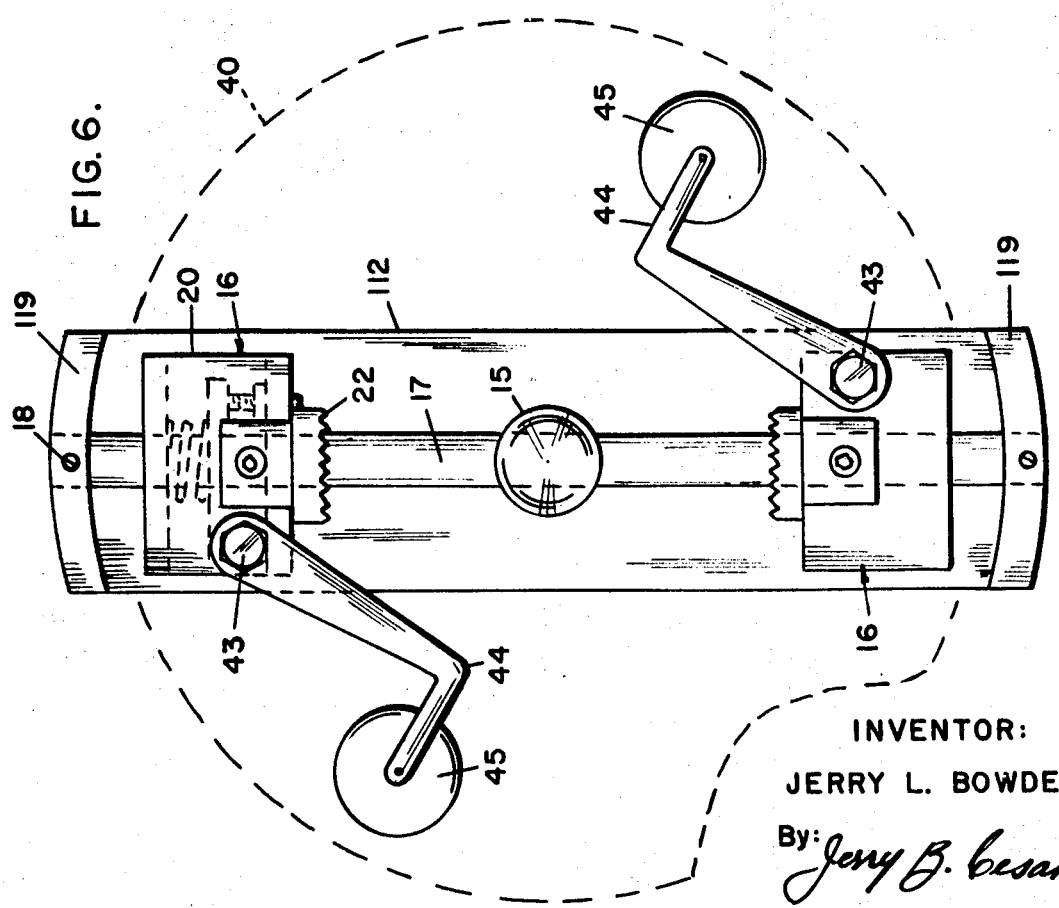

United States Patent Office 3,606,808
Patented Sept. 21, 1971

3,606,808
QUICK-ACTING CHUCKS
Jerry L. Bowden, R.R. Box 312, Crete, Ill. 60417
Filed Nov. 25, 1969, Ser. No. 879,692
Int. Cl. B23b *33/00*
U.S. Cl. 82—40
8 Claims

ABSTRACT OF THE DISCLOSURE

A rotatable carrier has a work supporting center and a shaft extending radially outwardly from the center. Co-acting jaw units are freely slidable on the shaft toward and away from the center and are provided with cam-actuated locking plates. The plates when unlocked slide freely on the shaft, but are cantable by cam action to a locking grip with the shaft, whereupon further cam action brings the jaw units into clamping engagement with work on the center.

---

This invention relates to new and useful improvements in work holding chucks such as those for use on lathes, and the like, and the principal object of the invention is to provide a quick-acting chuck having jaws which may be freely moved toward or away from the center for approximate adjustment to the size of a given piece of work, whereupon they may be brought into a firm clamping engagement with the work piece by cam action, thus eliminating the tedious procedure of slowly advancing or retracting the jaws through their whole range of adjustment, as by conventional screw-operated means.

The chuck of the invention is simple in construction, efficient and expeditious in operation, and lends itself to convenient and economical manufacture.

With the foregoing more important object and features in view and such other objects and features which may become apparent as this specification proceeds, the invention will be understood from the following description taken in conjunction with the accompanying drawings, wherein like characters of reference designate the like parts, and wherein:

FIG. 1 is a front elevational view showing one embodiment of a chuck in accordance with the invention;

FIG. 2 is a side elevational view thereof;

FIG. 3 is a sectional view, taken substantially in the plane of the line 3—3 in FIG. 2;

FIG. 4 is an enlarged, fragmentary sectional detail, taken substantially in the plane of the line 4—4 in FIG. 2;

FIG. 5 is a fragmentary sectional detail, taken substantially in the plane of the line 5—5 in FIG. 4;

FIG. 6 is a front elevational view showing a modified embodiment of the invention which is attachable to a conventional face plate of a lathe; and FIG. 7 is a side elevational view of the embodiment shown in FIG. 6.

Referring now to the accompanying drawings in detail, particularly to FIGS. 1–5 thereof, the quick-acting chuck of the invention is designated generally by the reference numeral 10. The same comprises a rotatable carrier plate 12 which is attachable by suitable screws 13 to a drive shaft 14, as for example of a lathe, and a work supporting center 15 projects from the plate 12 as shown.

As shown in the drawings, the chuck is provided with two opposing jaw units 16, but this is for illustrative purposes only and three or more such jaw units may be provided. In the illustrated arrangement utilizing only two jaw units, these are freely slidable on a shaft 17 which extends diametrically through the center 15 and has its opposite ends secured, as by set screws 18, in mounting blocks 19 which are suitably affixed at diametrically opposite points to the carrier plate 12. As will be apparent, the two jaw units 16 are slidable along the shaft 17 toward and away from the center 15, so that they may be quickly and easily adjusted to the approximate size of a particular piece of work (not shown) on the center. If more than two jaw units were to be provided, for example three jaw units spaced at 120°, the plate 12 would be equipped with three of the blocks 19 and three separate shafts would extend radially from the center 15 to the three blocks to carry the three jaw units, instead of the single diametrically extending shaft 17 carrying the two jaw units, as illustrated.

In any event, each of the jaw units 16 comprises an open-sided housing 20 formed with apertures 21 for sliding on the shaft 17, the housing also being in sliding engagement with the carrier plate 12 so as to prevent rotation of the housing about the shaft. A work engaging jaw member 22 is removably secured to the housing 20 as by suitable screws 11, this permitting various different jaw members to be interchangeably used in the device. As is best shown in FIG. 4, a locking plate 23 is positioned inside the housing 20 and is formed with an aperture 24 to slidably receive the shaft 17. At one side of the shaft 17 the locking plate 23 engages a fulcrum 25 in the form of a screw-threaded stud in the housing 20, the stud being held in an adjusted position by a lock nut 26. At the opposite side of the shaft 17, the locking plate is reduced in width to provide a tongue 23' which engages an eccentric portion or cam 27 of a cam shaft 27' which is rotatably journalled in the housing 20. A compression spring 28 is provided on the shaft 17 to react between the housing 20 and the locking plate 23, the spring thus biasing the housing 20 radially outwardly on the shaft 17 as well as retaining the plate 23 in engagement with the cam 27 and fulcrum 25.

When the plate 23 is in its unlocked position as shown in FIG. 4, the plate tongue 23' engages the low side of the cam 27 and the plate aperture 24 freely receives the shaft 17, so that the entire jaw unit 16, including the locking plate 23, may be freely slid along the shaft 17 as already mentioned. However, if the cam shaft 27' is rotated, for example as shown by the arrow 29 in FIG. 4, the cam 27 causes the plate 23 to become canted on the fulcrum 25 so that the shaft 17 becomes frictionally gripped in the aperture 24 of the plate 23, thus locking the plate against further sliding on the shaft. However, as rotation of the cam shaft 27' is continued, the cam 27 reacting against the plate tongue 23' will cause the housing 20 to slide along the shaft 17 toward the center 15, thus bringing the associated jaw member 22 into a firm clamping engagement with the work piece on the center.

For purposes of rotating the cam shafts 27' of the jaw units 16, the cam shafts project rearwardly from the housings 20 through slots 30 which are formed in the carrier plate 12 in parallel to the shaft 17, the slots permitting sliding movement of the cam shafts as the jaw units are moved toward or away from the center 15. The end portions of the cam shafts 27 behind the carrier plate 12 are equipped with enlarged heads 27" each equipped with a lever 31 which is pivoted by a pin 32 to a link 33, as will be apparent from FIGS. 3 and 5. The links 33 are pivoted as at 34 to a locking wheel 35 which is rotatably mounted on a flanged spigot 36 interposed between the carrier plate 12 and the drive shaft 14, as shown in FIG. 2. The wheel 35 and the carrier plate 12 rotate together with the drive shaft 14, but manual rotation of the wheel 35 independently of the plate 12 is translated by the links 33 and levers 31 to produce simultaneous rotation of the cam shafts 27', thus selectively locking or unlocking the locking plates 23 on the shaft 17 as already described.

The modified embodiment of the invention shown in FIGS. 6 and 7 is substantially the same as that of FIGS. 1–5, except that it is especially designed for use as an attachment to the conventional face plate 40 of a lathe without any structural modification of the lathe itself. As such, the attachment comprises a carrier plate 112 which may be elongated, rather than circular, to diametrically span the conventional face plate 40, the ends of the plate 112 being provided with rearwardly projecting flanges 41 for attachment of the plate to the periphery of the face plate, as by suitable screws 42. The ends of the plate are also provided with forwardly projecting blocks 119 for mounting the shaft 17.

The jaw units 16 are the same as already described, but different means are provided for rotating the cam shafts 27' of the jaw units. Rather than projecting rearwardly from the jaw units through slots in the carrier plate, the cam shafts 27' project forwardly from the jaw unit housings 20 and their projecting portions are in the form of polygonal heads 43, to which a conventional wrench may be applied for manually rotating each cam shaft in locking or unlocking the jaw units. However, preferably a hand lever 44 is secured to the head 43 of each cam shaft and is equipped with a hand knob 45, the levers and knobs being permanently associated with the cam shaft heads 43 so that the cam shafts 27' may be rotated between locked and unlocked positions whenever desired.

Although the cam action is such in both embodiments of the invention that the plates 23 remain locked upon locking, it will be noted that in the embodiment of FIGS. 6 and 7 the levers 44 and knobs 45 will respond to centrifugal force when the chuck is rotating, thus assisting to retain the locking plates 23 in their locked position.

Manifestly, the embodiment of FIGS. 6 and 7 may also be provided with more than two jaw units, as already explained in connection with the embodiment of FIGS. 1–5.

What is claimed as new is:

1. A quick-acting chuck, comprising in combination a rotatable carrier, a work supporting center projecting from said carrier, shaft means mounted on the carrier and extending radially outwardly from said center, at least two work engaging jaw units freely slidable on said shaft means toward and away from said center, a cantable locking plate fulcrumed on each jaw unit and provided with an aperture slidably receiving said shaft means when the plate is in its unlocked position, an adjustable fulcrum on each jaw unit for said locking plate, rotatable cam means on each jaw unit operatively engaging said plate whereby to initially lock the plate against sliding on said shaft means and subsequently slide the jaw unit along the shaft means toward said center when the plate is locked to the shaft means, and means for rotating said cam means.

2. The device as defined in claim 1 together with resilient means reacting between said jaw unit and locking plate to bias the jaw unit outwardly on said shaft means.

3. The device as defined in claim 1 wherein each of said jaw units comprises a housing slidable on said shaft means and a work engaging jaw member removably secured to said housing, a fulcrum provided in said housing at one side of said shaft means, said locking plate being disposed in the housing in engagement with said fulcrum, and said cam means being disposed in the housing in engagement with said locking plate at the relatively opposite side of said shaft means.

4. The device as defined in claim 3 wherein said cam means comprise a cam shaft rotatably journalled in said housing and projecting outwardly therefrom.

5. The device as defined in claim 3 together with a coil spring positioned on said shaft means and reacting between said housing and said locking plate to bias the housing outwardly on said shaft means.

6. The device as defined in claim 1 wherein said means for rotating said cam means comprise a locking wheel coaxially juxtaposed to said carrier, said carrier being provided with slots parallel to said shaft means, said cam means comprising cam shafts rotatably journalled in said jaw units and projecting through said slots, and linkage operatively connecting said locking wheel to said cam shafts for simultaneously rotating the same.

7. The device as defined in claim 1 wherein said carrier includes means for mounting the same on a conventional lathe face plate, said cam means comprising cam shafts rotatably journalled in said jaw units and projecting outwardly therefrom, said means for rotating said cam means being provided on the outwardly projecting portions of said cam shafts.

8. The device as defined in claim 7 wherein said means for rotating said cam means comprise locking levers secured to the outwardly projecting portions of said cam shafts.

References Cited
UNITED STATES PATENTS

| | | | |
|---|---|---|---|
| 2,367,045 | 1/1945 | Nightingale | 82—40 |
| 2,505,007 | 4/1950 | Rolland | 82—40 |

LEONIDAS VLACHOS, Primary Examiner

U.S. Cl. X.R.

279—119